United States Patent [19]

Sands et al.

[11] 3,977,066

[45] Aug. 31, 1976

[54] PIPEFITTING SECURING TOOL

[75] Inventors: Robert E. Sands, Shelbyville; Carl E. Floren, Decatur; William L. Hauffe, Warrensburg, all of Ill.

[73] Assignee: Mueller Co., Decatur, Ill.

[22] Filed: Sept. 19, 1975

[21] Appl. No.: 615,097

[52] U.S. Cl. .................................................. 29/237

[51] Int. Cl.² .......................................... B23P 19/04

[58] Field of Search ...................... 29/237; 254/29 R

[56] References Cited

UNITED STATES PATENTS

| | | | |
|---|---|---|---|
| 3,148,902 | 9/1964 | Gardner et al. | 285/339 |
| 3,281,929 | 11/1966 | Shinnick | 29/237 |
| 3,299,496 | 1/1967 | Christensen | 29/237 |
| 3,414,961 | 12/1968 | Bjalme | 29/237 |
| 3,599,310 | 8/1971 | Brownlee | 29/237 |

*Primary Examiner*—Al Lawrence Smith
*Assistant Examiner*—Roscoe V. Parker
*Attorney, Agent, or Firm*—Cushman, Darby & Cushman

[57] ABSTRACT

A tool for inserting a plastic pipe in a substantially axial direction into a stab-type coupling joint fitting or the like without damaging the exterior of the plastic pipe. The coupling joint fitting may be of the type having means therein for gripping the plastic pipe upon insertion of the same therein and also of the type wherein insertion of the plastic pipe activates closure means in the fitting to open the same and provide service. The means for attaching the tool to the fitting and to the plastic pipe are detachable from the tool whereby other means may be substituted therefor depending upon the sizes of the fitting and the plastic pipe upon which the tool is to be used. The actuating means for moving the attaching means for the pipe toward and away from the attachment means for the fitting is screw operated to provide ease of operation of the tool with a lever system providing a large mechanical advantage.

15 Claims, 6 Drawing Figures

PIPEFITTING SECURING TOOL

The present invention relates to an improved tool for inserting a plastic pipe in a substantially axial direction into a stab-type coupling joint fitting or the like and, more particularly, to a tool having improved attachment means for respectively engaging the fitting and the plastic pipe and improved actuating means. Ancillary to the above the tool provides improved means for gripping the plastic pipe without damaging the exterior of the same by permanently deforming or scratching.

BACKGROUND OF THE INVENTION

In recent years and, especially since the advent of plastic pipes, such as polyethylene (PE), polyvinyl cloride (PVC), polybutylene (PB), and the like, for use in fluid distribution systems, such as water or gas, there has been considerable research in developing "stab" type fittings for coupling plastic pipe to metal pipe or to other plastic pipe. While other types of couplings for plastic pipe have been designed, these usually required a solvent weld or a heat weld or flaring the end of the plastic pipe when inserted through a ring nut used to make up a joint and these prior practices required considerable skill and time to complete the coupling joint and in many cases where inexperienced personnel were performing the operation, leaks or improper joints resulted and the pipes were damaged.

The stab type of coupling jont for flareless or smooth end plastic pipe have proved quite successful in that they have reduced the cost and labor savings as well as providing an ease of proper installation even by inexperienced personnel. However, there have been some problems in installation of stab type joints between a fitting or another pipe and a smooth end pipe, or for that matter, a smooth end metallic pipe, in that the installer sometimes did not stab the pipe into the fitting a sufficient distance and further with the improvements in the gripping means of the fitting or in instances where the pipes and fittings were of extremely large size, it was often difficult and sometimes impossible to manually stab the pipe axially into the fitting.

Typical examples of stab type coupling joints for plastic pipe may be found in U.S. Pat. No. 3,815,940, issued June 14, 1974 to LUCKINBILL, U.S. patent application Ser. No. 504,249, filed Sept. 9, 1974 by LEOPOLD ET AL. and U.S. patent application Ser. No. 512,484, filed Oct. 4, 1974 by ELLIS, all being assigned to the same assignee as this application, namely, MUELLER CO., Decatur, Illinois. An additional example of such a coupling joint may be found in U.S. Pat. No. 3,844,585, issued Oct. 29, 1974 to SANDS ET AL. and assigned to MUELLER CO., the coupling joint being shown in FIGS. 7–9 and including an activating plug having a disc therein and a cutter which is activated upon completion of the joint by the stabbing of the pipe, the cutter severing at least a portion of the disc to provide communication with a pipe already under fluid pressure.

In order to improve the make up of a stab type coupling joint, mechanical means such as pliers and other tools have been developed and used. Where special tools were used, these usually included a tool having a first gripping means for gripping the fitting and a second gripping means for gripping the pipe and a complicated linkage and handle system connecting the two for moving the two towards and away from one another so that the pipe and the fitting moved relative one another in a generally axial direction. Usually these tools were quite complicated and expensive to manufacture and could be used only on one size of fitting of pipe. While most of these tools were primarily designed for assembling bell and spigot joints, there have been other tools of this character designed for smaller fittings and pipes but they have not been particularly designed for the utility of use with different size pipes and the gripping means for the tools were not designed for protecting the plastic pipe from damage by permanently marking the pipe with scratches on the exterior surface or from deforming the pipe in an out of round shape during installation which would cause possible improper installation. Additionally, such prior art tools did not accurately control the amount of movement of the respective gripping means of the tool relative one another and in most instances they involved complicated leverage systems which made the tool costly and bulky in size and yet they still required considerable manual effort upon the operator to complete a joint.

PRIOR ART

Prior art relating to tools for inserting a pipe into a fitting or a bell of another pipe by substantial axial movement of one relative to the other, are as follows:

| NUMBER | NAME | DATE |
|---|---|---|
| 3,148,902 | GARDNER, SR. ET AL. | Sept. 15, 1964 |
| 3,281,929 | SHINNICK | Nov. 1, 1966 |
| 3,299,496 | CHRISTENSEN | Jan. 24, 1967 |
| 3,414,961 | BJALME | Dec. 10, 1968 |
| 3,599,310 | BROWNLEE | Aug. 17, 1971 |

BRIEF SUMMARY OF THE INVENTION

Broadly stated, the present invention contemplates an improvement in a tool for inserting plastic or other pipe in a substantially axial direction into a stab-type coupling joint fitting or the like, the tool having an elongated base member with a first end portion having a jaw member detachably secured thereto for engaging the coupling joint fitting, a lever member pivotally mounted on the base member on an axis offset from the plane of the jaw member, the lever member having split clamp means detachably connected thereto for clamping about the plastic or other pipe. The lever member is pivoted about its pivot to the base member so that the split clamp means moves toward or away from the jaw member and a feed shaft threadedly received in the second end portion of the elongated base member, which is offset with respect to the first end portion, engages the lever member and when rotated is capable of causing the lever member to pivot. Means are provided for maintaining the jaw member and the split clamp means a predetermined distance apart prior to actuation of the tool.

The tool of the present invention further includes means on said feed shaft which permits said feed shaft to be advanced a predetermined distance so as to control the movement of said jaw member and said split clamp means toward one another.

A bearing socket is provided on the lever member for receiving the rounded end of the feed shaft whereby the feed shaft may be rotated and the lever member may be pivoted without binding between the end portion of the feed shaft and the lever member.

Both the jaw member and the split clamp means are detachably connected respectively to the base member and the lever member whereby the same may be replaced with different sized units to accommodate different sized pipes and fittings. The pivot means for the split clamp means also functions as the means for detachably retaining the split clamp means on the lever member, the jaw members which make up the split clamp means being locked by a stud member pivotally connected at one end to one of the jaw members and arranged to have nut means thereon which engage the other jaw member to lock the jaw member together about the pipe.

Since plastic pipe or soft metallic pipe such as copper or brass can have its external surface damaged by scratching or since the pipe can be damaged by gripping the same and causing it to take an out of round shape, the gripping jaw members of the split clamp means which have semi-circular opposed cutouts therein for surrounding the pipe, are each provided with teeth on and spaced axially of the semi-circular cutouts, the teeth having at least rounded crests to engage the pipe and, thus, provide no sharp indentations or scratches on the pipe surface. The roots between the teeth are also rounded and there is sufficient space between adjacent teeth to accommodate any flow of material from the pipe in a radial direction without substantial flow in an axial direction of the pipe.

The tool of the present invention is simple in construction and provides a large mechanical advantage for operation without the tool being bulky in size. Additionally, the improved tool of the present invention protects the plastic or other pipe and controls the amount of insertion of the pipe into the fitting. Because of its simplicity of design, the improved tool of the present invention permits make up of joints between plastic or other pipes and fittings by relatively unskilled personnel and the tool has further utility in that its gripping means may be replaced with other gripping means so that the tool can be used with various sizes and types of fittings and pipes.

DETAILED DESCRIPTION OF THE INVENTION

Figures 1, 2, 3:
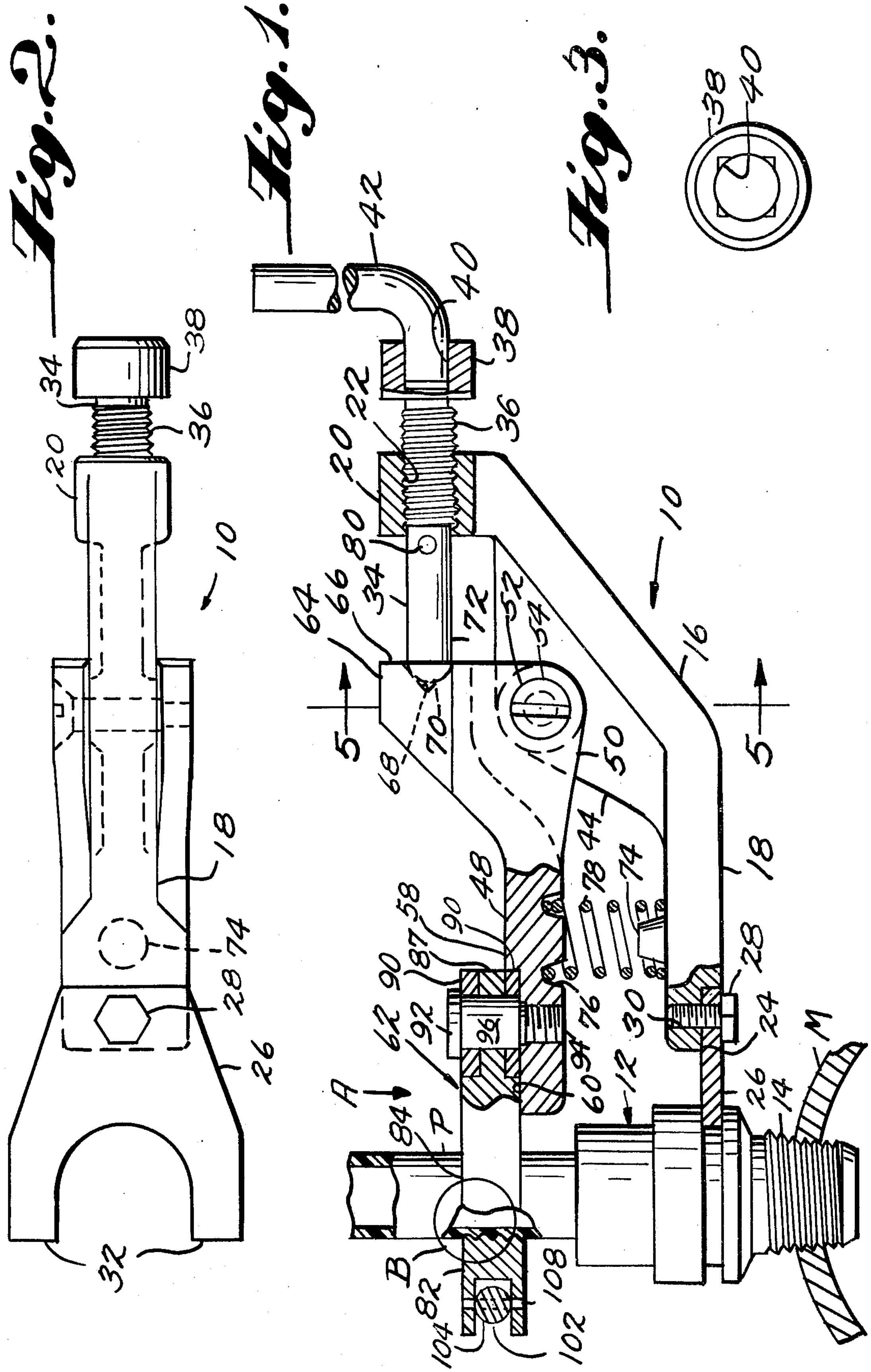
FIG. 1 is a side elevational view, partly in vertical section, of the tool of the present invention, the view illustrating the tool applied to a fitting and a pipe to be axially inserted into a fitting.
FIG. 2 is a bottom plan view of the tool shown in FIG. 1 with the fitting and pipe being omitted for purpose of clarity and with the split clamp means also omitted.
FIG. 3 is an end view of the head of the feed shaft looking from the right to the left of FIG. 2, the view being enlarged.

Referring now to the drawings wherein like characters or reference numerals represent like or similar parts there is disclosed in FIG. 1 a tool generally designated at 10 for making a coupling between a stab-type coupling joint fitting generally designated at 12 and a pipe P. The stab-type coupling joint 12 is disclosed as having exterior threads 14 with the same being threaded into a main M. More particularly, the stab-type coupling joint fitting 12 may be of the type as shown in the aforementioned U.S. Pat. No. 3,815,940 which utilizes a split gripper ring spread apart by stabbing of the pipe P therein and cammed about the pipe P when a force is applied tending to remove the pipe P from the coupling joint fitting. The stab-type coupling joint fitting 12 may also be of the type shown in FIG. 7 of the aforementioned U.S. Pat. No. 3,844,585 which includes a gripper ring but also includes a plug having a disc therein, the disc being cut by a cutter actuated by the stabbing action of the pipe P into the fitting so that service to a line under pressure can be instantly made.

While the stab-type coupling joint fitting 12 is shown as a fitting of the type threaded into a main, the fitting could be welded to the main or it could be a fitting connected to another pipe or it could be a portion of a valve to provide means for connecting a pipe to the valve. Also the stab-type coupling joint fitting 12 could have means for retaining the pipe P in the fitting such as disclosed in the aforementioned U.S. applications Ser. No. 504,249 and Ser. No. 512,484.

The pipe P is disclosed as a plastic pipe such as polyethylene (PE), polyvinyl chloride (PVC), polybutylene (PB), and the like which are not commonly used in fluid distribution systems, such as water or gas. However, the pipe P may also be a soft metal pipe such as brass, copper, or the like.

In making up a coupling from a stab-type coupling joint fitting and a pipe, it requires considerable force to stab the pipe into the fitting and properly seat the same against an internal annular flange or stop in the fitting. In some instances, where the pipe and the coupling joint fitting are small, the make up of the coupling may be done manually with some effort. However, as the size of the pipe and the fitting increase and also to insure proper make up, it often times takes more force to make the stab than can be realized manually and consequently, the present tool provides for a sufficient mechanical advantage whereby one is insured of a proper make up of a coupling every time.

In more detail, the tool 10 includes an elongated base member 16 having a first end portion 18 and a second end portion 20 offset with respect to the first end portion. The first end portion 18, at its end, is provided with a cutout 24 for receiving a jaw member 26, the jaw member 26 being detachably secured to the end portion 18 by means of a stud 28 extending through the jaw member and threaded into a threaded bore 30 in the first end portion 18. The jaw member 26 is bifurcated as indicated at 32 for extending about the coupling joint fitting 12 to engage any shoulder provided on the same.

The second end portion 20 of the elongated base member 16 is provided with a threaded bore 22 therethrough having an axis parallel to but offset from the plane of the jaw member 26. A feed shaft 34 having a threaded portion 36 is received in the threaded bore 22 of the second end portion 20, the feed shaft having a head 38 outwardly of the second end portion 20, the head having a non-circular socket 40 for receiving the end of a handle 42 or any other suitable means for rotation of the same.

Between the first end portion 18 and the second end portion 20 of the elongated base member 16, there is provided an upwardly extending web member 44 having a bore 46 therethrough, the bore 46 having an axis transverse to and offset inwardly from the axis of the feed shaft 34. The axis of the bore 46 is also offset upwardly of the plane of the jaw member 26.

Figure 5:
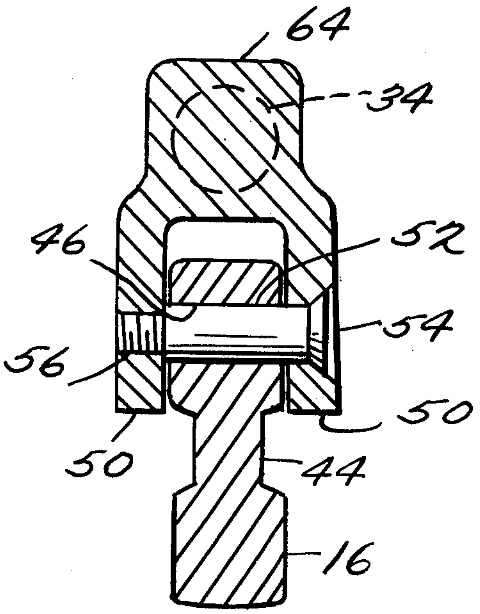
FIG. 5 is an enlarged sectional view taken on the line 5—5 of FIG. 1.

A lever member 48 having a bifurcated web portion 50 is pivotally mounted on the base member 16 by means of a pivot pin 52 extending through the bifurcated portion 50 and the bore 46 and the web member 44. In more detail and referring to FIG. 5, the pivot pin 52 has a head 54 with its opposite end threaded as indicated at 56, the threaded end 56 being threaded into one of the ears of the bifurcated portion 50 of the lever member 48. The lever member 48 is provided with an end portion 58 having a cutout 60 thereon for receiving split clamp means generally indicated at 62. The opposite end portion 64 of lever member 48 has a surface 66 thereon facing the second end portion 20 of the elongated base member 16. The surface 66 is provided with a conical socket 68 which is engaged by a rounded end 70 of the end portion 72 of feed shaft 34.

A projection 74 is provided on the face of the end portion 18 of elongated base member 16 which faces or opposes the end portion 58 of lever member 48. A groove 76 of greater diameter than the projection 74 is provided on the end portion 58 of the lever member 48 and directly opposes but is spaced from the projection 74. A coil spring 78 having one end carried in the groove 76 and the other end surrounding the projection 74 normally urges the lever member 48 and the base member 16 apart in the sense of the lever member 48 pivoting in a clockwise direction with respect to its pivot pin 52.

Since it is desirable to limit the outward pivoting of the lever member 48 to a position substantially as shown in FIG. 1, a roll pin 80 extending transversely through the feed shaft 34 is arranged to abut the end portion 20 of the base member 16 when the feed shaft 34 has been backed out a predetermined distance. This pin 80 coupled with the spring 78 urging the lever member 48 about the pivot pin 52 and away from the base member 16 maintains the jaw member 26 and the split clamp means 62 in a predetermined spaced apart position relative to each other prior to the operation of the tool. As will be understood, rotation of the feed shaft 34 in a manner to advance the same is also controlled as the head 38 of the shaft will abut the second end portion 20 of the base member 16, thus limiting the amount the pipe P can be inserted into the coupling joint fitting 12.

Figure 4:
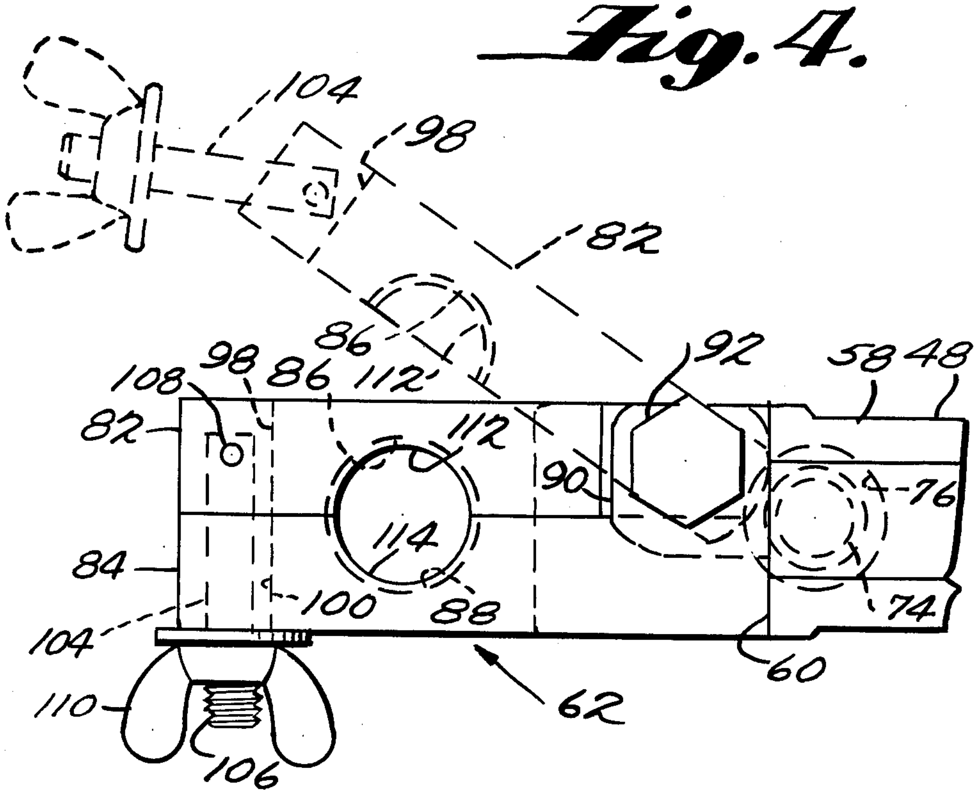
FIG. 4 is a fragmentary enlarged view of the split clamp means looking in the direction of the arrow A in FIG. 1, the broken line portion of the Figure representing the jaw members of the split clamp means being pivoted apart.

Referring now to FIGS. 1 and 4, it will be noted that the split clamp means 62 includes a first jaw member 82 and a second jaw member 84, the jaw members being detachably secured to the end portions 58 of the lever member 48 in the cutout 60. In more detail, the jaw member 82 and 84 have opposed semicircular cutouts 86 and 88 respectively for clamping about the pipe P. The jaw member 82 has an end portion 87 which fits between the bifurcated ears 90 of the jaw member 84 and a pivot pin 92 having a threaded end 94 and a shank portion 96 extends through the pivotable jaw members 82 and 84 and detachably retains them as a unit on the lever member 48. The outer free ends of the jaw member 82 and 84 are bifurcated as indicated at 98 and 100 respectively so that when the jaw members 82 and 84 are together in the solid line positions shown in FIG. 4, an outwardly opening groove 102 is defined. A stud 104 having a threaded end 106 is pivotally carried by the jaw member 82 within its bifurcated free end by a pivot pin 108. A wing nut 110 is arranged to be received on the threaded end 106 of the stud 104 and as now will be appreciated, this provides a locking means for locking the jaw member 82 and the jaw member 84 in a clamping position about the pipe P. When it is desired to remove the tool 10 from the pipe P, the wing nut 110 is backed off a sufficient distance to allow stud 104 to be swung outwardly as shown in broken lines in FIG. 4 and thus the jaw member 82 may be pivoted on the shank portion 96 of the pivot pin 92 while the pivot pin 92 also functions as a retaining means for detachably retaining the split clamp means 62 on the lever member 48.

Figure 6:
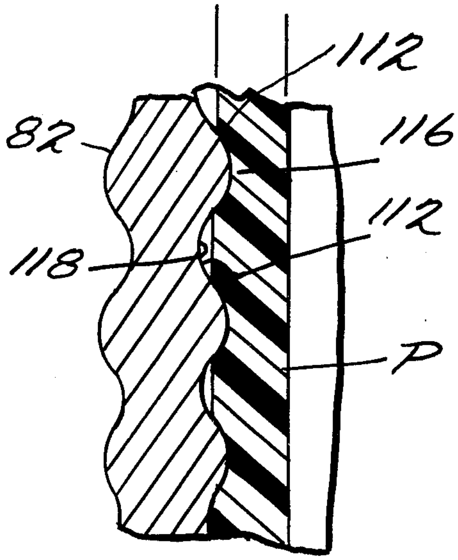
FIG. 6 is an exploded view of a portion of FIG. 1 encircled at B.

Referring now to FIG. 6 which is an exploded portion encircled at B in FIG. 1 it will be noted that the jaw members 82 and 84 are provided in their semi-circular cutouts 86 and 88 with axially-spaced teeth 112 and 114 respectively. Each of the teeth 112 and 114 has it crest rounded as indicated at 116 and, thus, when the jaw members 82 and 84 are clamped about the plastic pipe P, the rounded crest portions 116 of the teeth 112 tightly grip the pipe P, but the plastic is not scratched or cut as would be the case if the teeth were sharp. The depth of the teeth as well as the axial spacing of the teeth is such that the plastic material of the pipe P can flow radially outward of the pipe axis and not parallel to the pipe axis. The roots of the teeth may also be rounded as indicated at 118 if desired.

The tool 10 as described above provides all of the advantages and objects of the invention. By being compact and yet still having a large mechanical advantage, the operation is simplified. If a different size fitting and pipe are used, the jaw member 26 and the split clamp means 62 may be easily replaced with the proper size units. Additionally, the pipe P is moved in a substantially axial direction although it is realized that the lever member 48 does pivot but the arc of pivoting at point of gripping of the split clamp means 62 is so slight it doesn't affect the operation.

The terminology used throughout this specification is merely for the purpose of description and not limitation, the scope of the invention being defined in the claims.

What is claimed is:

1. A tool for inserting a plastic or other pipe substantially axially into a stab-type coupling joint fitting or the like comprising:

an elongated base member with a first end portion and a second end portion offset with respect to the first end portion, said second end portion having a threaded bore therethrough;

a jaw member detachably secured to said first end portion of said elongated base member for engaging the coupling joint fitting;

a lever member pivotally mounted to said base member on an axis offset from a plane of said jaw member and transverse to an axis of the threaded bore in said second end portion of said base member, said lever member having an end portion extending generally in the same direction as the first end portion of said base member and having a further end portion defining a surface spaced from and facing the second end portion of said base member;

split clamp means detachably connected to the end portion of said lever member for clamping about the plastic or other pipe without damaging the same;

means for maintaining the jaw and said clamp means a predetermined distance apart prior to actuation of the tool; and, a feed shaft having a threaded portion received in the threaded bore of said base member and an end portion engaging the surface of the further end portion of said lever member for pivoting said lever member and moving said clamp means toward said jaw when said shaft is rotated.

2. A tool as claimed in claim 1 in which said split clamp means includes a first jaw member having a semi-circular cutout therein and a second jaw member having a semi-circular cutout therein opposing the semi-circular cutout of said first jaw member, said first jaw member and said second jaw member being pivotally connected to each other, and means to lock said jaw members together about the plastic pipe.

3. A tool as claimed in claim 2 in which said first jaw member and said second jaw member are pivotally connected to each other by a pivot pin, said pivot pin also detachably retaining said split clamp means to said lever member while permitting said jaw members to be capable of pivoting when said lock means is released.

4. A tool as claimed in claim 2 in which said opposed cutouts of said jaw members of said clamp means are provided with teeth spaced axially of the opposed cutouts, said teeth having rounded crests whereby the plastic pipe is gripped without damage and/or permanent marking of the same.

5. A tool as claimed in claim 2 in which said first and second jaw members have free ends which are bifurcated and define an outwardly opening groove when said semi-circular cutouts oppose each other and in which said means to lock said lever members together about said plastic pipe include a stud pivoted at one end to the bifurcated end of one of said jaw members and arranged to be received in said groove and having the other end thereof extending out of the other jaw member when the semi-circular cutouts oppose one another, said other end having threads thereon, and nut means threaded onto said stud member for locking said jaw members together.

6. A tool as claimed in claim 2 in which said end portion of said lever member to which said clamp means is detachably connected is provided with a recess portion for receiving one of said jaw members of said clamp means and in which a pivot pin extends through said jaw members and is threaded into the cutout end portion of said lever member to retain the clamp means thereon while permitting pivoting of one jaw member relative to the other.

7. A tool as claimed in claim 2 in which said jaw member connected to said base member has a bifurcated end to engage the coupling joint fitting.

8. A tool as claimed in claim 1 in which said means for maintaining the jaw member of said base member and said clamp means of said lever member a predetermined distance apart includes a compression spring positioned between said first end portion of said base member and said lever member and stop means between said lever member and said second end portion of said base member.

9. A tool as claimed in claim 8 in which said stop means includes a pin extending through said feed shaft intermediate said further end portion of said lever member and said second end portion of said base member, said pin engaging said second end portion of said base member when said feed shaft has been withdrawn a predetermined amount.

10. A tool as claimed in claim 9 in which said surface of the further end portion of said lever member is provided with a bearing socket for receiving the end of the end portion of said feed shaft.

11. A tool as claimed in claim 10 in which said bearing socket is conical and in which the end portion of said feed shaft has an end which is rounded.

12. A tool as claimed in claim 9 including means to limit movement of said clamp means of said lever member toward said jaw member of said base member.

13. A tool as claimed in claim 12 in which said means includes a head on said feed shaft outwardly of said second end portion of said base member for engaging the same when said feed shaft has been advanced a predetermined distance.

14. A tool as claimed in claim 13 in which said head is provided with means for attaching means thereto for rotating said feed shaft.

15. A tool as claimed in claim 14 in which said attaching means includes a non-circular closed bottom bore therein.

* * * * *